Figure 1:
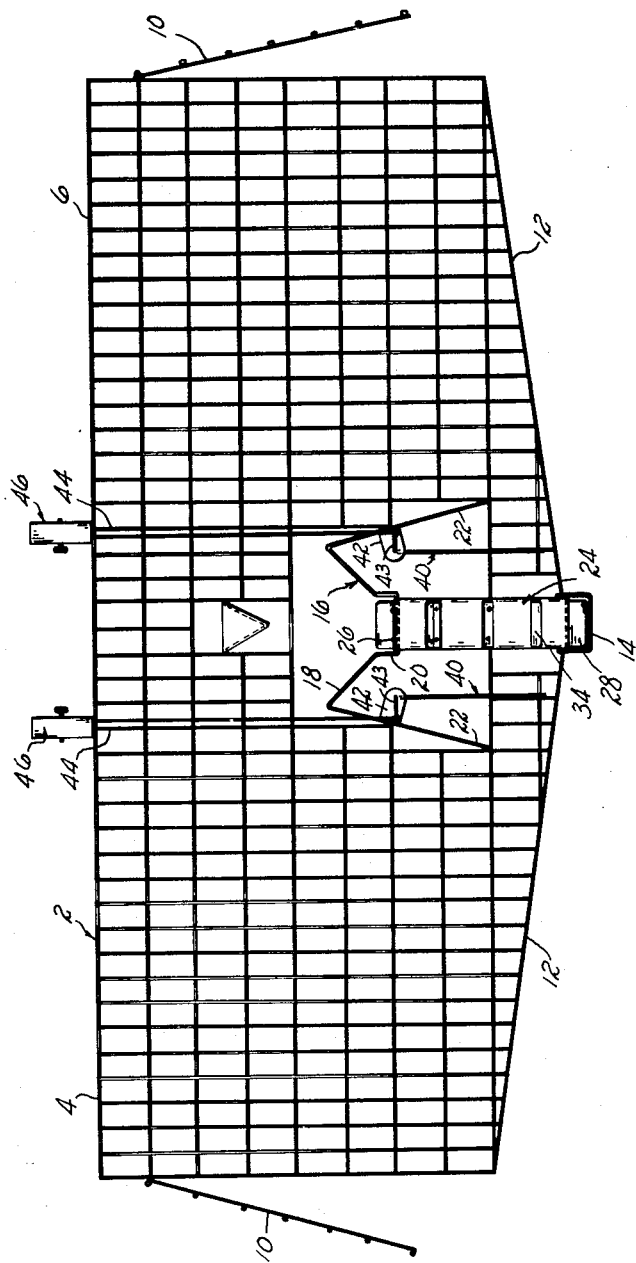

INVENTOR.
ROBERT W. HAYES
BY
Lindsey and Preutzman
ATTORNEYS

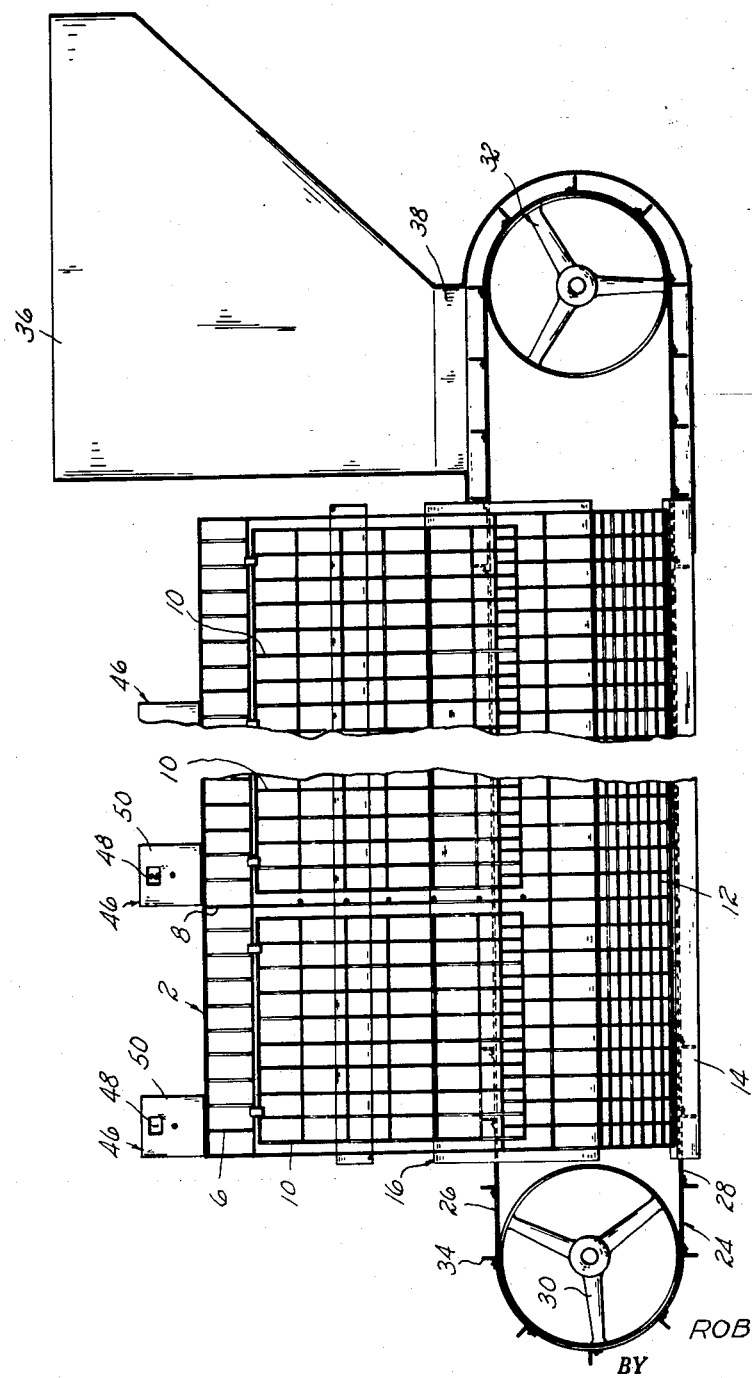

United States Patent Office 2,756,721
Patented July 31, 1956

2,756,721

AUTOMATIC FEED AND EGG CONVEYOR TYPE LAYING CAGE BATTERY

Robert W. Hayes, Unionville, Conn.

Application November 24, 1954, Serial No. 470,851

6 Claims. (Cl. 119—48)

This invention relates to laying cages for egg producing poultry.

The care and feeding of egg producing poultry has heretofore required large amounts of manual labor to perform the many routine tasks involved in providing adequately for the needs of the birds, collecting eggs, and recording egg production. As a result, considerable manpower is required, labor costs are substantial, and the performance manually of the many chores which must be done at frequent intervals often disturbs the birds and thus adversely affects egg production.

One of the objects of the invention therefore is to provide an improved laying cage in which the needs of the birds may be attended to with a minimum of labor and with a minimum of disturbance which would adversely affect egg production.

Another object is to provide an improved laying cage having automatic apparatus for mechanically distributing feed and water to the caged birds, collecting the eggs, and counting and recording the egg production of the individual birds.

Another object is to provide an improved poultry housing arrangement which is rugged, lightweight and inexpensive in construction, which provides comfortable, clean and safe accommodations for the birds, and which may be readily constructed to accommodate any desired number of birds.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is an end elevation view of a preferred embodiment of a laying cage constructed in accordance with the present invention; and Figure 2 is a fragmentary front view of the structure shown in Figure 1.

Referring to the drawings, a laying cage constructed in accordance with the present invention includes a generally rectangular enclosure or cage proper 2, of open wire grill construction. The cage is so dimensioned as to form a pair of elongate parallel cage sections 4, 6, and has a plurality of transverse wire grill partitions 8 dividing each cage section up into a number of individual compartments each designed to accommodate a single bird comfortably and safely. On the outer end of each bird compartment is a hinged wire grill door 10 through which a bird may be placed in or removed from the compartment. The cage 2 is thus rugged yet light in weight, so that it may be supported in any suitable manner such as by suspending it from the overhead by wires, and it may be as long as necessary to provide sufficient compartments for any desired number of birds.

Each of the cage sections has a wire grill floor 12 which slopes transversely toward the center of the cage, as best shown in Figure 1. The lowermost edges of the two floors are slightly spaced apart and between them is mounted a depending sheet metal egg return trough 14 of U-shaped cross section which extends the entire length of the cage. With this arrangement eggs deposited by the chickens on the floor of each compartment will roll automatically down the inclined floor to the egg return trough, and thus be removed automatically from danger of being trampled or otherwise injured by the birds themselves.

Spaced above the egg return trough 14 at a convenient height for the birds and situated between the cage sections is a sheet metal feed trough 16 which also extends the entire length of the cage, the several transverse partitions 8 being suitably cut away to accommodate the feed trough. The feed trough has upwardly and outwardly inclined sides 18 connected by a U-shaped bottom 20 of approximately the same width as the egg return trough. The feed trough is conveniently supported between downwardly and outwardly inclined sheet metal baffles or guards 22. The guards serve to keep the birds in the compartments from pecking at eggs in the egg return trough, and also serve to close the inner ends of the individual bird compartments, thus keeping the birds in opposite compartments suitably spaced while allowing them ready access to the feed trough. The bottom edge of each guard is spaced above the cage floor sufficiently to allow an egg on the floor to roll freely beneath the guard. Spaced above the feed trough is a sheet metal watering trough which likewise extends the entire length of the cage through suitable openings in partitions 8, and is easily accessible to the birds in the compartments.

Feed is automatically supplied to the feed trough and eggs automatically collected from the egg return trough by a single endless conveyor belt 24. The conveyor belt extends longitudinally between the cage sections and has an upper course 26 which is received in and adapted to travel along the U-shaped bottom 20 of the feed trough and a lower course 28 which is received in the egg return trough 14. The belt is supported at one end by an idler pulley 30 and at its other end by a drive pulley 32 which is rotated by a suitable motor, not shown. On the outer surface of the belt are longitudinally spaced outstanding flights 34 which are slightly smaller in transverse dimension than the U-shaped bottom 20 of the feed trough. At one end of cage 2 is mounted a feed hopper 36 having a discharge mouth 38 at its lower end beneath which the upper course of the belt passes in advancing toward the cage.

The inner side of the belt has a relatively smooth surface which in the lower course of the belt is disposed just below the top of the egg return trough and provides a resilient floor or bottom therefor, the depth of the egg return trough being sufficient to freely accommodate the flights of the belt.

Situated at the inner end of each bird compartment between the egg return trough 14 and the guard 22 is a pendulous arm or trip lever 40 which is supported by ears 42 on the guard for free swinging movement in a transverse direction. The lower portion of each trip lever 40 is bent at right angles so as to extend across the bird compartment just above the floor thereof in the path of an egg rolling down the floor toward the egg return trough. Each trip lever has a crank portion 43 which is connected by an actuating rod 44 to a counter 46 mounted on the top of the bird compartment and readable through a viewing window 48 in the counter casing 50.

In the use of the apparatus the hopper is filled with feed and the watering trough with water, and at suitable intervals the belt drive is operated. As the belt advances feed discharging from the hopper onto the moving belt is conveyed along the feed trough 16 by the moving flights 34, and thus is distributed in a uniform and economical manner along the full length of the feed trough, so that all of the birds are assured of an adequate supply of fresh feed. When necessary the watering trough may be easily and conveniently cleaned simply by attaching to the belt a suitable swab which will be driven automatically the full length of the watering trough when the belt is advanced. The birds in the various compartments have ready access to both the feed trough and watering trough, yet are sufficiently isolated from each other to provide a comfortable and safe environment insuring maximum egg production. Eggs deposited on the floor in the individual compartments roll freely down the floor beneath the guard out of reach of the birds and into the egg return trough. The resilient surface provided by the lower course of the belt in the egg return trough minimizes danger of damage to the eggs, and the belt itself provides a movable floor which mechanically collects the eggs and conveys them to the end of the cage each time the belt is operated. In rolling down the floor, each egg engages and moves the pendulous trip lever 40 for the particular bird compartment, thereby actuating the counter for that compartment so that a continuous record of egg production for each bird is maintained automatically.

Thus there has been shown and described an improved laying cage arrangement in which the needs of the birds and the collection of eggs are provided for automatically. The resulting elimination of substantially all the manual labor heretofore required greatly reduces operating costs as well as increasing the comfort and lessening disturbance of the birds, and thereby contributes to maximum egg production.

As many changes could be made in the above construction and many apparently widely different embodiments of this invention could be made without department from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a laying cage for chickens, a pair of spaced parallel elongate wire cage sections each having transverse partitions forming a plurality of individual bird compartments, a wire grill floor for each cage section transversely inclined downwardly toward the space between the cage sections, a longitudinally extending egg return trough disposed between the adjacent edges of said floors, a longitudinally extending sheet metal feed trough between the cages above the egg return trough having a U-shaped bottom, an endless conveyor belt between the cage sections having a forwardly traveling grain-delivering section in said feed trough and a rearwardly traveling egg-collecting section in said egg return trough, and sheet metal guards integral with the feed trough extending longitudinally between each cage section and the egg-collection section of the belt.

2. In a laying cage for chickens, a pair of spaced parallel elongate wire cage sections each having transverse partitions forming a plurality of individual bird compartments, a floor for each cage section transversely inclined downwardly toward the space between the cage section, a longitudinally extending egg return trough disposed between the opposed edges of said floors, a longitudinally extending sheet metal feed trough between the cage sections above the egg return trough having upwardly and outwardly inclined sides and a channel-shaped bottom, a longitudinally extending endless conveyor belt disposed between the cage sections, said belt traveling one way in the feed trough and the other way in the egg return trough and having outstanding flights for conveying grain along the feed trough, sheet metal guards integral with the feed trough disposed between each cage section and the egg return trough, a movable trip lever for each bird compartment disposed in the path of an egg rolling down the floor therefrom to said egg return trough, and an egg counter for each compartment operable by movement of said trip lever.

3. In a laying cage for chickens, a pair of spaced parallel elongate wire cage sections each having transverse partitions forming a plurality of individual bird compartments, a floor for each cage section transversely inclined downwardly toward the space between the cage sections, a longitudinally extending egg return trough disposed between the opposed edges of said floors, a longitudinally extending sheet metal feed trough between the cage sections above the egg return trough having upwardly and outwardly inclined sides and a channel-shaped bottom, a longitudinally extending water trough spaced above the feed trough, a longitudinally extending endless belt disposed in a generally vertical plane between the cage sections having an upper course traveling one way in said bottom of said feed trough and a lower course traveling the other way in said egg return trough, said belt having longitudinally spaced outstanding feed-conveying flights on its outer side freely movable through the bottom of the feed trough and having a smooth inner side for carrying eggs along the egg return trough, sheet metal guards integral with the feed trough disposed between each cage section and the egg return trough, and a movable trip lever for each bird compartment disposed in the path of an egg rolling down the floor therefrom toward said egg return trough, and an egg counter on each bird compartment operable by movement of said trip lever.

4. In a laying cage for chickens, an elongated enclosure having a transversely sloping floor, a plurality of partitions extending transversely of the enclosure to form a plurality of individual bird compartments, a first trough extending longitudinally of the enclosure with the top of the trough in registry with the lower edge of the sloping floor, a second trough disposed above and parallel to said first trough, an endless conveyor belt disposed within both of said troughs, means to advance the belt relative to said troughs, and guard means extending longitudinally of the enclosure adjacent said first trough to form a barrier to prohibit access of a bird within a compartment to said first trough, said guard means being spaced vertically from the floor to permit passage of an egg from within a compartment to said first trough.

5. In a laying cage for chickens, an elongated enclosure, a plurality of partitions extending transversely of the enclosure to form a plurality of individual compartments, said enclosure being provided with a floor inclined transversely thereof, a first trough disposed longitudinally of the enclosure with the top of the trough in registry with the lower edge of the inclined floor whereby an egg may roll down the floor into said first trough, a second trough positioned above and parallel to said first trough, an endless conveyor belt disposed along the bottom of said second trough and within and adjacent the top of said first trough, means to advance the belt relative to said troughs, and guard means depending from said second trough and extending longitudinally of the enclosure, said guard means being spaced vertically from the floor to permit passage of an egg thereunder.

6. In a laying cage for chickens, an elongated enclosure having a plurality of partitions extending transversely thereof and being provided with a floor inclined inwardly and downwardly of the longitudinal edges of the enclosure, an elongated first trough depending from the enclosure in registry with the apex of the floor thereof, the floor being non-continuous between the longitudinal edges of said first trough, a second elongated trough spaced above said first trough and parallel therewith, an endless conveyor belt disposed along the bottom of said second trough and having a plurality of grain moving flights extending transversely thereof and spaced longitudinally therealong, said flights extending upwardly of the portion of the belt within said second trough, said belt being disposed within said first trough with the flights thereon depending therefrom and the inner surface of the belt extending adjacent the top of said troughs, means extending longitudinally of the enclosure above said second trough to divide the enclosure into a plurality of pairs of oppositely facing individual compartments, and elongated guard members extending longitudinally adjacent either side of said second trough and extending transversely toward said floor, said guard members being vertically spaced from said floor sufficiently to permit the passage of an egg from one of said compartments into said first trough and onto the inner surface of the belt.

References Cited in the file of this patent

UNITED STATES PATENTS

| | | |
|---|---|---|
| 2,305,708 | Jacobsen | Dec. 22, 1942 |
| 2,612,862 | Ipsen | Oct. 7, 1952 |
| 2,613,641 | Cordis | Oct. 14, 1952 |
| 2,693,169 | Otis | Nov. 2, 1954 |
| 2,710,682 | Coll | June 14, 1955 |